United States Patent
Ventelon et al.

(10) Patent No.: US 7,884,153 B2
(45) Date of Patent: Feb. 8, 2011

(54) METHOD FOR PREPARING ANISOTROPIC SILICA AGGREGATES

(75) Inventors: Lionel Ventelon, Seneffe (BE); Julien Hernandez, Antony (FR); Françoise Lafuma, Sceaux (FR); Christophe Chassenieux, Paris (FR); Christelle Perreur, Bram (FR)

(73) Assignees: Rhodia Chimie, Aubervilliers (FR); C.N.R.S., Paris (FR)

( * ) Notice: Subject to any disclaimer, the term of this patent is extended or adjusted under 35 U.S.C. 154(b) by 946 days.

(21) Appl. No.: 10/563,792

(22) PCT Filed: Jul. 7, 2004

(86) PCT No.: PCT/FR2004/001763

§ 371 (c)(1), (2), (4) Date: May 7, 2007

(87) PCT Pub. No.: WO2005/007574

PCT Pub. Date: Jan. 27, 2005

(65) Prior Publication Data

US 2007/0219305 A1    Sep. 20, 2007

(30) Foreign Application Priority Data

Jul. 10, 2003   (FR) .................................. 03 08467

(51) Int. Cl.
C08K 3/36 (2006.01)
C01B 33/18 (2006.01)

(52) U.S. Cl. ....................................... 524/492; 524/493
(58) Field of Classification Search ................. 524/492, 524/493
See application file for complete search history.

(56) References Cited

FOREIGN PATENT DOCUMENTS

| | | |
|---|---|---|
| EP | 0 227 346 A2 | 7/1987 |
| WO | WO 96/34062 A1 | 10/1996 |
| WO | WO 9634062 A1 * | 10/1996 |
| WO | WO 03/054089 A1 | 7/2003 |

* cited by examiner

*Primary Examiner*—Kelechi C Egwim
(74) *Attorney, Agent, or Firm*—Buchanan Ingersoll & Rooney PC

(57) ABSTRACT

The invention concerns a method for preparing anisotropic silica aggregates comprising the following steps: a) contacting at least one polymer with non-aggregated silica particles and/or highly dispersed in an aqueous medium, with a ratio R, polymer weight to silica particle surface, ranging between 0.03 and 2 mg/m; 2; and whereof the electrostatic value of the silica particle surface is not less than the value of the charge of the silica particle surface measured in an aqueous phase without added salts at a pH not less than 7; b) consolidating the aggregates obtained at step a) either by heat treatment, or by precipitation of a mineral compound. The invention also concerns a silica aggregate comprising a chaining of elementary particles whereof the number of particles ranges between 5 and 15, whereof 80% of elementary particles are in contact with not more than 2 particles and whereof the greatest distance measurable between 2 points of the aggregate is not more than 5 times the average size of one elementary particle.

12 Claims, No Drawings

METHOD FOR PREPARING ANISOTROPIC SILICA AGGREGATES

This application is an application under 35 U.S.C. Section 371 of International Application Number PCT/FR2004/001763 filed on Jul. 7, 2004.

The present invention concerns a process for the preparation of anisotropic aggregates of silica.

Some manufactured or industrial products incorporate in their manufacture silica particles in various forms and in particular in the form of anisotropic aggregates. These silica particles are of advantage as reinforcing filler, as viscosifying or texturizing agent or as catalyst support in various fields.

However, the synthesis of anisotropic aggregates of silica is problematic and difficult due to the amorphous nature of the silica, which implies that there is no preferential orientation during the nucleation or the growth of the solid.

Moreover, the production of anisotropic aggregates of silica involves very strict control of the aggregation phenomena, that is to say of the interactions existing between the silica particles, which is very difficult and generally results in an aggregate morphology which is isotropic overall. The aggregation phenomenon is essentially controlled either by the presence of salts, or by the concentration of particles, or by the presence of entities which can react with the surface of the silica and thus modify its surface, or by the acidity conditions, which modify the surface charge of the silica and the reactivity of the surface of the silica (catalysis of the oxolation).

In order to meet the requirements of manufacturers, it has become necessary to provide a process for the preparation of anisotropic aggregates of silica which makes it possible to control the aggregation of the silica particles.

Consequently, the problem which the invention intends to solve is that of providing a process for the preparation of anisotropic aggregates, the conditions for the implementation of which make it possible to control the aggregation of the silica particles.

With this aim, the invention provides a process for the preparation of anisotropic aggregates of silica which comprises the following stages:

a) at least one polymer is brought into contact with silica particles which are nonaggregated and/or which exhibit a high degree of dispersion in an aqueous medium, with a ratio R, weight of polymer with respect to the surface area of the silica particles, of between 0.02 and 2 mg/m$^2$, the value of the electrostatic charge of the surface of the silica particles being greater than or equal to the value of the charge of the surface of the silica particles measured in an aqueous phase without added salts at a pH of greater than or equal to 7;

b) the aggregates obtained in stage a) are consolidated, either by a heat treatment or by precipitation of an inorganic compound.

Another subject matter of the invention is an aggregate of silica comprising a sequence of individual silica particles for which the number of particles is between 5 and 15, for which at least 80% of the individual particles are in contact with at most 2 particles and for which the greatest distance measurable between 2 points of the aggregate is less than or equal to 5 times the mean size of an individual particle.

The advantage of the process according to the invention is that of making possible the control of the aggregation of the silica particles under very simple conditions for implementing the process by simple addition of at least one polymer to the reaction medium.

Moreover, the consolidation stage b) can be carried out under saline conditions, that is to say by simple addition of salts of inorganic cations which will precipitate at the grain joints.

Advantageously, this process makes it possible to obtain sols of anisotropic aggregates or powders by simple drying of the sol.

A further advantage of the process according to the invention is very fine control of the final size of the individual particles, of the morphology of the aggregate and of the size of the aggregate. It thus makes it possible to produce anisotropic silica aggregates which are firm, which are irreversible, which no longer break and which are easy to produce. These anisotropic aggregates, due to their novel morphology, have reinforcing properties, viscosifying or texturizing agent properties or catalyst support properties.

Other advantages and characteristics of the invention will become clearly apparent on reading the description and examples, given purely by way of illustration and without implied limitation, which will follow.

A subject matter of the invention is first of all a process for the preparation of anisotropic aggregates of silica which comprises the following stages:

a) at least one polymer is brought into contact with silica particles which are nonaggregated and/or which exhibit a high, degree of dispersion in an aqueous medium, with a ratio R, weight of polymer with respect to the surface area of the silica particles, of between 0.02 and 2 mg/m$^2$, the value of the electrostatic charge of the surface of the silica particles being greater than or equal to the value of the charge of the surface of the silica particles measured in an aqueous phase without added salts at a pH of greater than or equal to 7;

b) the aggregates obtained in stage a) are consolidated, either by a heat treatment or by precipitation of an inorganic compound.

The term "anisotropic aggregates", within the meaning of the invention, is understood as meaning aggregates comprising a minimum of 5 individual particles and for which at least 50% (percentage by number) of the individual particles have 2 neighbors.

The term "individual particle", within the meaning of the invention, is understood as meaning the base component of the aggregate (also known as primary particle).

Preferably, the silica particles employed in stage a) of the process according to the invention are highly dispersed and nonaggregated. In order to obtain such particles, the most favorable conditions are a desalinized medium and a high pH.

Preferably, in the case where the process is carried out in an aqueous medium, basic pH conditions of greater than 7, more preferably still of greater than 8, will be chosen.

Advantageously, the silica particles employed are silica sols, which can be obtained by any process which makes it possible to result in silica sols. Mention may in particular be made, inter alia, of processes with resins, ultrafiltration or also electrodialysis, but also processes by polymerization of silicon alkoxide in an organic solvent (silica of Stöber type).

Use will preferably be made of a silica sol for which the size of the silica particles is between 3 and 50 nm, more preferably still between 5 and 20 nm, the sizes being measured by transmission electron microscopy. The transmission electron microscopy observations were carried out on a Jeol 1200 device. A drop of the sample to be observed is deposited on a circular copper grid with a diameter of 3 mm covered with a membrane of collodion and hydrophilized carbon. The surplus is absorbed with filter paper so as to leave only a thin film of liquid on the grid. The grid is subsequently allowed to dry at ambient temperature.

Use will preferably be made of a silica sol for which the silica particles exhibit a BET specific surface of between 50 and 880 m$^2$/g, preferably between 130 and 530 m$^2$/g, measured on a dried sol. The BET specific surface is determined according to the Brunauer-Emmet-Teller method described in the Journal of the American Chemical Society, vol. 60, page 309, February 1938, and corresponding to the international standard ISO 5794/1 (Annex D).

Use may be made, for example, of the silica sols of Ludox 12 nm and 220 m$^2$/g type (in particular HS30).

In stage a) of the process according to the invention, the silica particles are brought into contact with a polymer, the role of which is to aggregate the particles in an anisotropic manner.

The ratio R, weight of polymer with respect to the surface area developed by the silica particles, is preferably between 0.05 and 1.8 mg/m$^2$.

The polymer employed in the process according to the invention advantageously exhibits a specific affinity for the surface of the silica. This polymer is generally an organic molecule of hydrophilic type but can also have one or more hydrophobic parts. The polymer can be chosen from homopolymers, copolymers, linear polymers, grafted polymers or dendrimers. Their composition can be based on a single monomer unit or several units (random or block arrangement). The polymer can have an electrostatic charge (preference will be given to anionic polymers comprising less than 50% of anionic units or to cationic polymers) or be uncharged. The molecular mass of the polymer is not limiting since it is possible to produce anisotropic aggregates with high molecular masses as with low molecular masses.

The polymer employed in the process according to the invention advantageously makes it possible to carry out the aggregating under conditions where the silica has a strong surface electrostatic charge (high pH, weak ionic strength). Advantageously, the presence of this surface charge causes the silica particles to aggregate in an anisotropic manner.

Preferably, the polymer employed in the process according to the invention is a polymer chosen from the following polymers, copolymers or grafted polymers: polyoxyethylene (POE), poly(vinyl alcohol) (PVA), polyvinylpyrrolidone (PVP), polyacrylamide (PAM), polymethacrylamides, poly(N-isopropylacrylamide) (PNIPAM) and other N-substituted derivatives, polysaccharides, such as amylose, dextran, guar and derivatives or modified celluloses, polyvinylpyrrolidone-poly(acrylic acid) (PVP-PAA), polyoxyethylene-poly(acrylic acid) (POE-PAA), poly-acrylamide-polyvinylpyrrolidone (PAM-PVP), polyvinylamine, polydiallyldimethylammonium (PDADMAC), polyacrylamide-polydiallyldimethylammonium (PAM-PDADMAC), the polymers based on quaternized or nonquaternized amines and their copolymers with nonionic or anionic monomers, such as polyethyleneimine, polyvinylimidazole, the various poly(aminoalkyl acrylate)s and poly(aminoalkyl methacrylate)s, random or grafted copolymers of anionic monomers (acrylic or methacrylic acid, inter alia) with cationic or nonionic monomers, or carboxymethylated polysaccharides.

These polymers exhibit favored interactions with the surface of the silica and can enter into interaction with the surface of the silica, for example via hydrogen bond, via electrostatic interaction or by becoming attached in an ionocovalent or covalent manner.

Stage a) of the process according to the invention is preferably carried out in an aqueous medium at a basic pH of greater than 7, more preferably still at a pH of greater than 8. These pH values can vary according to the nature of the reaction medium and in particular in an aqueous/alcoholic medium.

In a second step, the anisotropic aggregate obtained in stage a) is consolidated during stage b) of the process.

The aggregation by polymers (stage a) generally results in objects which may be divisible, as long as an inorganic compound has not consolidated the aggregate of silica. The consolidation is thus a necessary stage which can consist in depositing an inorganic compound on the anisotropic aggregates of silica. This results in the formation of a joint which prevents the aggregate from subsequently breaking by a chemical or mechanical operation.

This consolidation is carried out either by a heat treatment or by precipitation of an inorganic compound.

When stage b) consists of a heat treatment, the temperature of the heat treatment is at least 80° C., more particularly at least 100° C., preferably at least 120° C.

The duration of the heat treatment is determined according to the use capable of being envisaged for the anisotropic aggregates of silica. The duration of the heat treatment makes it possible to control the divisible nature of the aggregate.

This heat treatment can be carried out by autoclaving.

On conclusion of the heat treatment, it is possible to obtain a colloidal silica dispersion (silica sol) when a dispersion is treated thermally.

Stage b) of the process according to the invention can be carried out by precipitation of an inorganic compound.

In the latter case, the inorganic compound is chosen from silicates, phosphates, silicophosphates, aluminates, silicoaluminates, cerium, zinc, iron, titanium, zirconium, carbonates, rare earths, divalent cations or their mixtures.

Preferably, the inorganic compound is a silicate or any common form of silicates, such as metasilicates, disilicates and advantageously an alkali metal silicate, in particular sodium silicate or potassium silicate.

Preferably, the inorganic compound is a sodium silicate exhibiting an SiO$_2$/Na$_2$O ratio by weight Rw of between 0.5 and 4.

The silicate can exhibit a concentration (expressed as weight of silica) of between 10 and 330 g/l, preferably of between 15 and 300 g/l, in particular of between 60 and 260 g/l.

Advantageously, the precipitation of the inorganic compound is carried out according to the conventional conditions for the precipitation of this compound.

In the case of a silicate, the precipitation is carried out by simultaneously adding the silicate to be precipitated and an acidifying agent, so as to maintain the pH at a value of at least 6.

Use is generally made, as acidifying agent, of a strong inorganic acid such as sulfuric acid, nitric acid or hydrochloric acid, or of an organic acid such as acetic acid, formic acid or carbonic acid.

The acidifying agent can be dilute or concentrated; its normality can be between 0.4 and 36N, preferably between 0.6 and 3N.

In particular, in the case where the acidifying agent would be sulfuric acid, its concentration can be between 20 and 180 g/l, preferably between 40 and 130 g/l.

Generally, use is made, as acidifying agent, of sulfuric acid and, as silicate, of sodium silicate.

The precipitation of the inorganic compound makes it possible to obtain a precipitate of a metal salt, of a metal oxide or of a metal hydroxide. The salt is advantageously chosen from a silicate, a silicoaluminate, a silicophosphate, a phosphate or a carbonate. The metal is advantageously a metal chosen from silicon, calcium, magnesium, cerium, zinc, iron, titanium, zirconium or aluminum.

Advantageously, on conclusion of stage b), which has just been described and which is carried out by precipitation of an inorganic compound, a silica slurry is obtained and is subsequently separated (liquid-solid separation).

This separation, carried out in the preparation process according to the invention, usually comprises a filtration, if necessary followed by a washing. The filtration is carried out according to any suitable method, for example using a filter press, a belt filter or a vacuum filter.

The silica suspension or filtration cake thus recovered is subsequently dried. It should be noted that the filtration cake is not always under conditions which allow it to be atomized, in particular because of its high viscosity. In a way known per se, the cake is then subjected to a disintegrating operation. This operation can be carried out mechanically, by passing the cake into a mill of colloid or bead type. The disintegrating is generally carried out in the presence of an aluminum compound, in particular sodium aluminate, and optionally in the presence of an acidifying agent, as described above (in the latter case, the aluminum compound and the acidifying agent are generally added simultaneously). The disintegrating operation makes it possible in particular to lower the viscosity of the suspension to be subsequently dried.

The silica suspension thus recovered is subsequently dried.

On conclusion of stage b) which is carried out by heat treatment, it is possible to obtain a colloidal dispersion which can also subsequently be dried.

In both these cases, the drying can be carried out according to any means known per se.

Preferably, the drying is carried out by atomization. To this end, use may be made of any type of suitable atomizer, in particular a rotary, nozzle, liquid pressure or two-fluid atomizer. Generally, when the filtration is carried out using a filter press, a nozzle atomizer is used and, when the filtration is carried out using a vacuum filter, a rotary atomizer is used.

When the drying is carried out using a nozzle atomizer, the silica liable to be then obtained usually exists in the form of substantially spherical beads.

On conclusion of the drying, it is then possible to carry out a milling stage on the product recovered. The silica which is then liable to be obtained generally exists in the form of a powder.

When the drying is carried out using a rotary atomizer, the silica liable to be then obtained can exist in the form of a powder.

Finally, the dried (in particular by a rotary atomizer) or milled product as indicated above can optionally be subjected to an agglomeration stage which consists, for example, of a direct tableting, a wet granulation (that is to say, with use of a binder, such as water, silica suspension, and the like), an extrusion or, preferably, a dry compacting. When the latter technique is employed, it can prove to be advisable, before carrying out the compacting, to deaerate (operation also referred to as predensifying or degassing) the pulverulent products so as to remove the air included in the latter and to provide more uniform compacting.

The silica liable to be then obtained by this agglomeration stage generally exists in the form of granules.

The silica powders, as well as the silica beads, obtained by the process according to the invention thus offer the advantage, inter alia, of giving access to granules in a simple, effective and economical way, in particular by conventional shaping operations, such as, for example, a granulation or a compacting, without the latter resulting in damage liable to obscure, indeed even eliminate, the good intrinsic properties attached to these powders or these beads, as can be the case in the prior art employing conventional powders.

In a specific case of the process according to the invention, it is possible to use poly(N-isopropyl-acrylamide) as polymer in stage a).

The silicas liable to be obtained by the process according to the invention using poly(N-isopropyl-acrylamide) as polymer in stage a) also constitute one of the subject matters of the present invention.

Another subject matter of the invention is a silica aggregate comprising a sequence of individual silica particles for which the number of particles is between 5 and 15, for which at least 80% of the individual particles are in contact with at most 2 particles and for which the greatest distance measurable between 2 points of the aggregate is less than or equal to 5 times the mean size of an individual particle.

Preferably, the greatest distance measurable between 2 points of the aggregate is less than or equal to 4 times the mean size of an individual particle.

Another subject matter of the invention is the use of the silicas produced from poly(N-isopropylacrylamide) as polymer or of the aggregates mentioned above as reinforcing filler for a composition formed of polymers, in particular of plastics and of rubber (for example, shoe soles), viscosifying, texturizing or anticaking agent, anticracking agent, in particular in the petroleum field, polishing agent, in particular for toothpastes and paper, coating agent, in particular in the textile field, active material absorbent, catalyst support or component for battery separators.

The following examples illustrate the invention without, however, limiting the scope thereof.

EXAMPLES

Example 1

1 liter of a solution of polyoxyethylene (POE) with a molar mass of $10^6$ g/mol is prepared at a concentration of 0.8 g/l by dilution with purified water and then brought to pH 9 (with sodium hydroxide).

1 liter of silica sol (Ludox HS30 from Du Pont) is prepared at a concentration of 20 g/l by dilution with purified water and then the sol is brought to pH 9. The particles have a diameter of the order of 12 nm (specific surface of 220 $m^2$/g).

The POE solution is rapidly introduced into the silica sol. The mixture can also be prepared by introducing the sol into the POE solution or by simultaneous addition. The mixture is left to mature for one hour. Under these conditions, the pH is in the region of 9 and the ratio R, POE/silica, has a value of 0.2 mg of POE/$m^2$ of silica.

Consolidation of the Aggregates:

The POE/silica mixture is heated to 85° C. and the pH is adjusted to 9 in a stirred 4 liter reactor. A solution of sodium silicate with a ratio by weight Rw of 3.55 (Rw=$SiO_2/Na_2O$) at an $SiO_2$ concentration of 57 g/l and a 20 g/l sulfuric acid solution are added to the reactor simultaneously. The flow rate for addition of the silicate solution is set at 12 g/min and the flow rate for addition of the sulfuric acid solution is adjusted so as to keep the pH constant at 9. The duration of the simultaneous addition varies according to the level of consolidation (=weight of silica added/weight of silica initially present in the vessel heel) which it is desired to obtain. Conventionally, for particles with a size of 12 nm, a level of consolidation of 50% makes it possible to effectively strengthen the aggregates. At the end of the addition, the addition of silicate is halted and the pH is lowered to 4. The suspension is filtered, washed and then dried (oven, atomization). It is possible to add coagulants at the end of the simultaneous addition in order to facilitate the filtration; for example, the addition of a 0.4 mol/l $MgSO_4$ solution in a proportion of 50 ml of solution per 600 ml of suspension facilitates the filtration and the successive washing operations.

The final product has a specific surface of 147 $m^2/g$ and a dispersibility, measured by particle sizing using a Sedigraph, giving a level of particles having a diameter of less than 0.3 microns of 96%. The particle size analysis is based on a sedimentation principle with a particle size measuring device, such as the Sedigraph 5100 (249 ET 041), in order to analyze the sedimentation of the aggregates according to the invention. The technique employed can comprise a first stage of dispersion of a powder in an aqueous medium and a stage of deagglomeration by ultrasound with a probe with a power of approximately 600 watts, plus or minus 20%, for 7 minutes. It is also possible to carry out the measurement directly on a dispersion or on a colloidal dispersion according to the invention, without preliminary stages.

The consolidation of the aggregates can also be carried out by autoclaving the POE/silica mixture. In this case, the strengthening of the aggregates is due to redissolution/precipitation mechanisms at the grain joints:

700 ml of the silica sol/POE mixture, with a silica concentration of 10 g/l and a POE $10^6$ g/mol concentration of 0.4 g/l, are introduced into a 1 l autoclave. The mixture is stirred and simultaneously heated up to 130° C. at the rate of a rise of 3° C./min. It is maintained at 130° C. for 6 hours and then naturally cooled down to ambient temperature.

Transmission electron microscopy (TEM) shows anisotropic aggregates, the majority of which comprise at least approximately ten particles. The photographs are taken by cryogenation of the samples in order to avoid possible aggregation during drying. In the case where the sample to be observed is a powder, the latter is dispersed in water at a content of the order of 1 mg/l. Passage through an ultrasound bath makes it possible to deagglomerate the product. In these photographs it is possible to determine the number of neighboring particles in the aggregate (table 1).

TABLE 1

| | No. of particles counted | | | |
|---|---|---|---|---|
| | 1 neighboring | 2 neighboring | 3 neighboring | 4 neighboring |
| Test 1 | 15% | 72% | 12% | 1% |
| Test 2 | 11% | 72% | 16% | 1% |

The table is read as follows for the first line: in an aggregate, 15% of the particles are in contact with only a single particle, 72% of the. particles are in contact with 2 particles, 12% of the particles are in contact with 3 particles and 1% of the particles are in contact with 4 particles.

These figures indicate that the aggregates are quite linear and not very branched.

Example 2

A silica sol with a concentration of 22 g/l is prepared by dilution of a Ludox HS30 sol with deionized water. The medium is brought to pH 9 by addition of sodium hydroxide.

A solution of poly(N-isopropylacrylamide) with a molecular mass of 820 000 g/mol is prepared at a concentration of 7.3 g/l.

The sol of anisotropic aggregate is prepared by introduction of 10 ml of the silica sol into 10 ml of the polymer solution. The polymer/silica ratio R is 1.5 $mg/M^2$. The mixing is carried out with vigorous stirring in a few minutes and then the stirring is maintained at a moderate rate for 32 hours.

The mixture is heated at 98° C. for 48 hours.

Example 3

A silica sol with a concentration of 22 g/l is prepared by dilution of a Ludox HS30 sol with deionized water. The medium is brought to pH 9 by addition of sodium hydroxide.

A solution of poly(N-isopropylacrylamide) with a molecular mass of 820 000 g/mol is prepared at a concentration of 5.5 g/l.

The sol of anisotropic aggregate is prepared by introduction of 10 ml of the silica sol into 12 ml of the polymer solution. The polymer/silica ratio R is 1.36 $mg/m^2$.

The mixing is carried out with vigorous stirring in a few minutes and then the stirring is maintained at a moderate rate for 32 hours.

The mixture is heated at 98° C. for 48 hours.

Example 4

A silica sol with a concentration of 22 g/l is prepared by dilution of a Ludox HS30 sol with deionized water. The medium is brought to pH 9 by addition of sodium hydroxide.

A solution of poly(N-isopropylacrylamide) with a molecular mass of 820 000 g/mol is prepared at a concentration of 3.2 g/l.

The sol of anisotropic aggregate is prepared by introduction of 10 ml of the silica sol into 12 ml of the polymer solution. The polymer/silica ratio R is 0.8 $mg/m^2$.

The mixing is carried out with vigorous stirring in a few minutes and then the stirring is maintained at a moderate rate for 32 hours.

The mixture is heated at 98° C. for 48 hours.

Results of examples 2 to 4: by microscopy, aggregates are observed composed of sequences of 6 to 10 particles for which the greatest distance measurable between two points of the sequence is less than 50 nm. At least 85% of the individual particles are in contact with at most 2 particles.

The invention claimed is:

1. A process for the preparation of anisotropic aggregates of silica comprising the stages of:
    a) contacting at least one polymer with silica particles which are nonaggregated and/or which exhibit a high degree of dispersion in an aqueous medium, with a ratio R, weight of polymer with respect to the surface area of the silica particles, of between 0.02 and 2 $mg/m^2$, the value of the electrostatic charge of the surface of the silica particles being greater than or equal to the value of the charge of the surface of the silica particles measured in an aqueous phase without added salts at a pH of greater than or equal to 7; and
    b) consolidating the aggregates obtained in stage a), either by a heat treatment or by precipitation of an inorganic compound.

2. The process as claimed in claim 1, wherein stage a) is carried out with a ratio R, weight of polymer to surface area of the silica particles, of between 0.05 and 1.8 $mg/m^2$.

3. The process as claimed in claim 1, wherein in stage a), the silica particles are added by means of a silica sol for which the size of the silica particles is between 3 and 50 nm.

4. The process as claimed in one of the preceding claims, wherein in stage a), the polymer is a homopolymer, copolymer, linear polymer, dendrimer or grafted polymer.

5. The process as claimed in claim 4, wherein the polymer is:

polyoxyethylene (POE), poly(vinyl alcohol) (PVA), polyvinylpyrrolidone (PVP), polyacrylamide (PAM), polymethacrylamides, poly(N-isopropylacrylamide) (PNIPAM), polysaccharides, amylase, dextran, guar, modified celluloses, polyvinylpyrrolidone-poly(acrylic acid) (PVP-PAA), polyoxyethylene-poly(acrylic acid) (POE-PAA), polyacrylamide-polyvinylpyrrolidone (PAM-PVP), poly-vinylamine, polydiallyldimethylammonium (PDADMAC), polyacrylamide-polydiallyldimethylammonium (PAM-PDADMAC), polymer based on quatermized or nonquatermized amines, polyethyleneimine, polyethyleneimine copolymer with nonionic or anionic monomers, polyvinylimidazole, poly(aminoalkyl acrylate), poly(aminoalkyl methacrylate), random copolymer of an anionic monomer with a cationic or nonionic monomer, grafted copolymer of an anionic monomer with a cationic or nonionic monomer, or a carboxymethylated polysaccharide.

6. The process as claimed in claim 1, wherein, in stage b), a heat treatment is further carried out at a temperature of at least 80° C.

7. The process as claimed in claim 1 wherein, in stage b), a precipitation of an inorganic compound chosen from silicates, phosphates, silicophosphates, aluminates, silicoaluminates, cerium, zinc, iron, titanium, zirconium, carbonates, rare earths, divalent cations or their mixtures is further carried out.

8. The process as claimed in claim 7, wherein the inorganic compound is a sodium silicate exhibiting an $SiO_2/Na_2O$ ratio by weight Rw of between 0.5 and 4.

9. The process as claimed in claim 7, wherein the precipitation of the silicate is carried out by simultaneously adding the silicate to be precipitated and an acidifying agent, so as to maintain the pH at a value of at least 6.

10. The process as claimed in claim 9, wherein an acidifying agent is further added.

11. The process as claimed in claim 10, wherein the acidifying agent is sulfuric acid, nitric acid, hydrochloric acid, acetic acid, formic acid or carbonic acid.

12. The process as claimed in claim 1, wherein the polymer is poly(N-isopropylacrylamide).

* * * * *